United States Patent
Kudo

(10) Patent No.: US 11,108,052 B2
(45) Date of Patent: Aug. 31, 2021

(54) ROLLED COPPER FOIL FOR NEGATIVE ELECTRODE CURRENT COLLECTOR OF SECONDARY BATTERY, NEGATIVE ELECTRODE OF SECONDARY BATTERY AND SECONDARY BATTERY USING THE ROLLED COPPER, AND METHOD FOR MANUFACTURING ROLLED COPPER FOIL FOR NEGATIVE ELECTRODE CURRENT COLLECTOR OF SECONDARY BATTERY

(71) Applicant: JX Nippon Mining & Metals Corporation, Tokyo (JP)

(72) Inventor: Katsuhiro Kudo, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 76 days.

(21) Appl. No.: 16/165,092

(22) Filed: Oct. 19, 2018

(65) Prior Publication Data

US 2019/0123358 A1  Apr. 25, 2019

(30) Foreign Application Priority Data

Oct. 19, 2017 (JP) .............................. JP2017-202943

(51) Int. Cl.
| | |
|---|---|
| *H01M 4/66* | (2006.01) |
| *C22F 1/08* | (2006.01) |
| *C22C 9/00* | (2006.01) |
| *C22C 9/02* | (2006.01) |
| *H01M 4/78* | (2006.01) |
| *H01M 10/0525* | (2010.01) |
| *H01M 4/02* | (2006.01) |

(52) U.S. Cl.
CPC .............. *H01M 4/661* (2013.01); *C22C 9/00* (2013.01); *C22C 9/02* (2013.01); *C22F 1/08* (2013.01); *H01M 4/662* (2013.01); *H01M 4/78* (2013.01); *H01M 10/0525* (2013.01); *H01M 2004/027* (2013.01)

(58) Field of Classification Search
CPC ........ H01M 4/661; H01M 4/662; H01M 4/78; H01M 2004/027; C22F 1/08
See application file for complete search history.

(56) References Cited

U.S. PATENT DOCUMENTS

| | | | |
|---|---|---|---|
| 2002/0157741 A1 | 10/2002 | Yamamoto et al. | |
| 2016/0201180 A1* | 7/2016 | Oishi ....................... | C21D 9/46 148/501 |

FOREIGN PATENT DOCUMENTS

| | | | |
|---|---|---|---|
| EP | 2184371 A1 | 5/2010 | |
| EP | 3020838 A1 | 5/2016 | |
| JP | 2011108442 A | 6/2011 | |
| JP | 2013209686 A | 10/2013 | |
| JP | 201517301 A | 1/2015 | |
| JP | 20163358 A | 1/2016 | |
| JP | 2016003358 | * 1/2016 | |
| TW | 201602370 A | 1/2016 | |
| TW | 1621721 B | 4/2018 | |
| WO | 2013021969 A1 | 2/2013 | |

OTHER PUBLICATIONS

Extended European Search Report for EP 18201274.0 dated Mar. 13, 2019, 10 pages.

* cited by examiner

*Primary Examiner* — Ula C Ruddock
*Assistant Examiner* — Thomas H. Parsons
(74) *Attorney, Agent, or Firm* — Faegre Drinker Biddle & Reath LLP

(57) ABSTRACT

The present invention is intended to provide a rolled copper foil for a secondary battery negative electrode current collector which can satisfactorily suppress rupture of the copper foil caused by stress generation or the like due to volume change of an active material. A rolled copper foil for a secondary battery negative electrode current collector, wherein a tensile strength in a direction parallel to the rolling direction is 600 MPa or more, and a breaking elongation in the direction parallel to the rolling direction is 2.0% or more; and wherein a tensile strength in a direction orthogonal to the rolling direction is 640 MPa or more, and a breaking elongation in the direction orthogonal to the rolling direction is 3.5% or more.

11 Claims, 1 Drawing Sheet

[Fig.1]
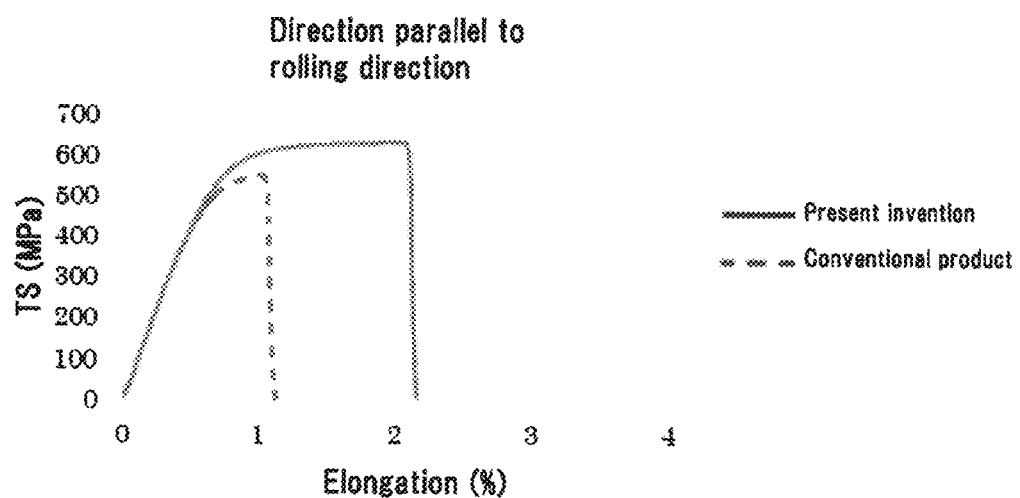
[Fig. 2]
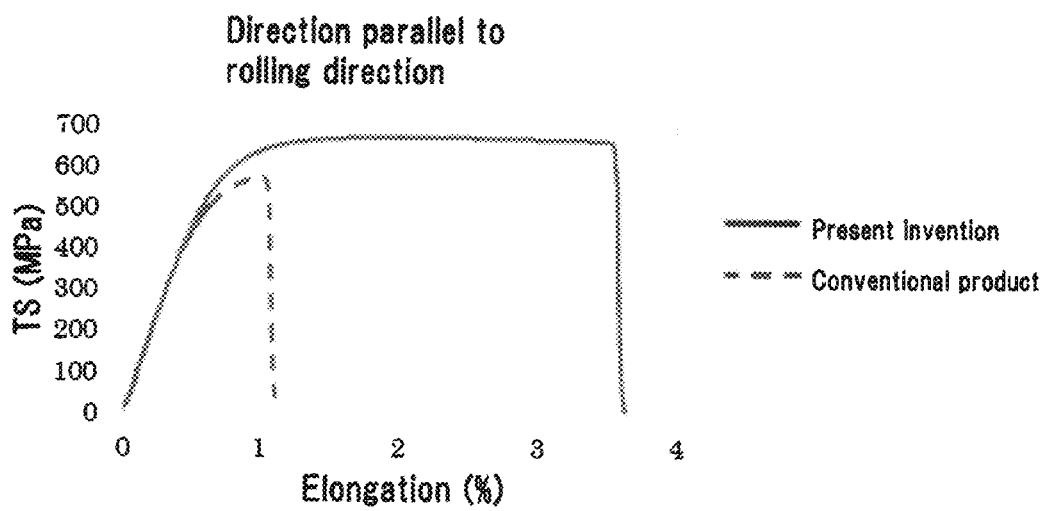

ROLLED COPPER FOIL FOR NEGATIVE ELECTRODE CURRENT COLLECTOR OF SECONDARY BATTERY, NEGATIVE ELECTRODE OF SECONDARY BATTERY AND SECONDARY BATTERY USING THE ROLLED COPPER, AND METHOD FOR MANUFACTURING ROLLED COPPER FOIL FOR NEGATIVE ELECTRODE CURRENT COLLECTOR OF SECONDARY BATTERY

TECHNICAL FIELD

The present invention is related to a rolled copper foil for a secondary battery negative electrode current collector, a secondary battery negative electrode and a secondary battery using the rolled copper foil, and a method for manufacturing a rolled copper foil for a secondary battery negative electrode current collector.

BACKGROUND ART

Secondary batteries, particularly lithium ion secondary batteries, are characterized by high energy density and capability of obtaining relatively high voltage, and are widely used for small electronic devices such as notebook computers, video cameras, digital cameras, cellular phones, etc. Further, lithium ion secondary batteries have also been used as power sources for large-sized equipment such as electric cars and distributed home power supply. Since lithium ion secondary batteries are lighter in weight and higher in energy density than other secondary batteries, they are widely used in various devices which require power sources.

The electrode body of a lithium ion secondary battery generally has a winding structure or a stack structure in which each electrode is stacked. Generally, the positive electrode of the lithium ion secondary battery is composed of a current collector made of aluminum foil and a positive electrode active material made of a lithium composite oxide such as $LiCoO_2$, $NiO_2$, $LiMn_2O_4$ or the like provided on the surface thereof and the negative electrode is composed of a current collector made of a copper foil and a negative electrode active material made of carbon or the like provided on the surface of the current collector.

By the way, in batteries having the structure in which a electrode body is wound, the stress concentrates in the vicinity of the inner circumferential portion of the winding structure in which the radius of curvature becomes particularly small due to expansion and contraction of the active material during charging and discharging. Therefore, cracks are generated in the current collector, and the current collector tends to be broken, which causes deterioration of cycle characteristics of the battery. Specifically, as the active material expands and shrinks by charging and discharging, the copper foil as the current collector is repeatedly subjected to stress concentration so that the current collector is partially bent and deformed. Bending deformation is repeated by charging and discharging. Under such severe conditions, cracks and breaks occur in the copper foil as a current collector, and conduction resistance increases and the cycle characteristics of the battery deteriorate in some cases.

As a solution to the above problems, Patent Document 1 discloses a copper alloy foil, comprising either 0.04 to 0.20 mass % of Sn or 0.01 mass % or more of Ag, or comprising both Sn and Ag of a sum of 0.20 mass % or less, the rest being copper and inevitable impurities, wherein after heated at 200° C. for 1 hour, a tensile strength is 450 N/mm$^2$ or more, and an elongation is 2.0% or more.

Further, Patent Document 1 also discloses a method for manufacturing a caper alloy foil, comprising a step of casting an ingot, the ingot comprising either 0.04 to 0.20 mass % of Sn or 0.01 mass % or more of Ag, or comprising both Sn and Ag of a sum of 0.20 mass % or less, the rest being copper and inevitable impurities; a hot rolling step of hot rolling the ingot under certain conditions to form a hot rolled rod; a first cold rolling step of cold rolling and annealing the hot rolled rod to form a annealed rod; a second cold rolling step of cold rolling the annealed rod in which the working ratio of each pass is 60% or less. By this method, the copper alloy foil has not only a desirable tensile strength but also a desirable elongation. Therefore, breakage of the copper alloy foil, which could not be conventionally suppressed for copper alloy foils having a desirable tensile strength, can also be suppressed.

SUMMARY OF INVENTION

However, with the increase in capacity of the secondary battery, larger capacity active material has been used. Accordingly, a rolled copper foil for a secondary battery negative electrode current collector, which can withstand a larger volume change, is required.

As a result of intensive studies, the inventors have found that, for a rolled copper foil for a secondary battery negative electrode current collector, by increasing the tensile strength and breaking elongation in the direction parallel to the rolling direction and in the direction orthogonal to the rolling direction, it is possible to suppress the breakage resulting from stress generation due to volume change of active material.

Further, the present inventors have found that, in manufacturing a rolled copper foil for a secondary battery negative electrode current collector, after hot-rolling an ingot, by performing a step of final cold rolling, in which work rolls with certain a diameter are used and the working ratio in each pass is 24% or more and the total working ratio is more than 99.9%, both the strength and the elongation can be improved by work hardening of the copper foil and the fracture of the copper foil due to the stress caused by the volume change of the active material can be suppressed.

Accordingly, the present invention is described as below.

(1) A rolled copper foil for a secondary battery negative electrode current collector, wherein a tensile strength in a direction parallel to the rolling direction is 600 MPa or more, and a breaking elongation in the direction parallel to the rolling direction is 2.0% or more; and wherein a tensile strength in a direction orthogonal to the rolling direction is 640 MPa or more, and a breaking elongation in the direction orthogonal to the rolling direction is 3.5% or more.

(2) The rolled copper foil for a secondary battery negative electrode current collector according to (1), wherein after a heat treatment at 200° C. for 60 minutes, the tensile strength in the direction parallel to the rolling direction is 600 MPa or more, the breaking elongation in the direction parallel to the rolling direction is 2.0% or more, the tensile strength in the direction orthogonal to the rolling direction is 640 MPa or more, and the breaking elongation in the direction orthogonal to the rolling direction is 3.5% or more.

(3) The rolled copper foil for a secondary battery negative electrode current collector according to (1) or (2), wherein a 0.2% yield strength in the direction parallel to the rolling direction is 480 MPa or more, and a 0.2% yield strength in the direction orthogonal to the rolling direction is 510 MPa or more.

(4) The rolled copper foil for a secondary battery negative electrode current collector according to any one of (1) to (3), wherein after a heat treatment at 200° C. for 60 minutes, the 0.2% yield strength in the direction parallel to the rolling direction is 480 MPa or more, and the 0.2% yield strength in the direction orthogonal to the rolling direction is 510 MPa or more.

(5) The rolled copper foil for a secondary battery negative electrode current collector according to any one of (1) to (4), comprising 0.05 to 0.20 mass % of Sn.

(6) The rolled copper foil for a secondary battery negative electrode current collector according to any one of (1) to (5), further comprising 0.01 to 0.10 mass % of Ag.

(7) A secondary battery negative electrode current collector, comprising the rolled Copper foil for a secondary battery negative electrode current collector according to any one of (1) to (6).

(8) A secondary battery negative electrode, comprising the rolled copper foil for a secondary battery negative electrode current collector according to any one of (1) to (6).

(9) A secondary battery, comprising the rolled copper foil for a secondary battery negative electrode current collector according to any one of (1) to (6).

(10) A method for manufacturing the rolled copper foil for a secondary battery negative electrode current collector according to any one of (1) to (6), the method comprising a step of hot rolling an ingot, and a step of final cold rolling in which the ingot is rolled to a predetermined thickness, wherein in the step of final cold rolling, a working degree η at the end of each pass and a diameter η (mm) of the work roll used in the pass satisfy the relationship η×r≤250;

wherein in the step of final cold rolling, a working ratio of each pass is 24% or more; and a total working ratio is more than 99.9%, the working degree η is calculated by the following equation:

$$\eta = \ln(T_0/T_n)$$  Equation 1 wherein $T_0$ is the thickness of the ingot before the step of final cold rolling, and $T_n$ is the thickness of the ingot at the end of n-th pass.

(11) The method for manufacturing a rolled copper foil for a secondary battery negative electrode current collector according to (10), further comprising a step of cold rolling and a step of annealing treatment, wherein the step of cold rolling and the step of annealing treatment are performed on the ingot after the hot rolling, and before the step of final cold rolling.

According to the present invention, it is possible to provide a rolled copper foil for a secondary battery negative electrode current collector capable of satisfactorily suppressing breakage of the copper foil caused by stress generation or the like due to volume change of active material. It is expected to contribute to improvement of charge/discharge repetition characteristics and realization of high capacity of secondary battery, especially lithium ion battery.

BRIEF DESCRIPTION OF THE DRAWINGS

FIG. 1 shows the tensile strength and the breaking elongation in the direction parallel to the rolling direction of the rolled copper foil according to one embodiment of the present invention and the prior art.

FIG. 2 shows the tensile strength and the breaking elongation in the direction orthogonal to the rolling direction of the rolled copper foil according to one embodiment of the present invention and the prior art.

DESCRIPTION OF EMBODIMENTS

Embodiments of the present invention are described in detail below.

Composition of Rolled Copper Foil

The material of the rolled copper foil for a secondary battery negative electrode current collector of the present embodiment is preferably tough pitch copper specified in JIS-H3100-C1100 or oxygen free copper specified JIS-H3100-C1020. Since these compositions are close to pure copper, the conductivity of the copper foil does not decrease and it is suitable for a current collector. The oxygen concentration contained in the copper foil is 0.01 to 0.02 mass % in the case of tough pitch copper and 0.001 mass % or less in the case of oxygen free copper.

The copper foil according to the present invention is formed of copper used industrially and may contain inevitable impurities. Even if minute amounts of P, Fe, Zr, Mg, S, Ge and Ti as inevitable impurities are present, the crystal orientation is liable to rotate due to bending deformation of the copper foil and shear bands may generate. Further, cracks and fractures are likely to occur when the electric bodies repeat bending deformation. Therefore, it is preferable to reduce inevitable impurities. For this reason, the copper foil according to the present embodiment may contain one or more selected from the group consisting of P, Fe, Zr, Mg, S, Ge and Ti as inevitable impurities, and it is preferable to control the total amount of the inevitable impurities to 20 mass ppm or less.

Further, for improving the properties of the material, Sn may be contained in an amount of 0.05 to 0.20 mass %, and Ag may be contained in an amount of 0.01 to 0.10 mass %. When Ag or Sn is added to the copper foil, the strength of the material after finish rolling can be increased and handling property of the material can be improved. Nevertheless, when the addition amount of Ag exceeds 0.10 mass %, or when the addition amount of Sn exceeds 0.20 mass %, the conductivity decreases and the recrystallization temperature increases to make recrystallization annealing difficult while suppressing the surface oxidation of the copper alloy, and in the production process of the negative electrode material, the copper foil serving as a current collector becomes difficult to be recrystallized during drying after coating active material, so that the characteristics of the present invention cannot be exhibited. Also, since Ag is expensive, it is not desirable to add a large amount of Ag from the viewpoint of cost. Therefore, the addition amount of Ag is preferably 0.10 mass % or less and the addition amount of Sn is preferably 0.20 mass % or less, respectively.

Here, since Ag is harder to oxidize than Cu, it can be added in either of tough pitch copper and oxygen free copper melt. However, with regard to the oxygen concentration, when the amount exceeds 500 mass ppm, the copper oxide particles increase and adverse influences such as becoming a starting point of the crack generation of the copper foil in the charge/discharge cycle test of the battery may happen, so the oxygen concentration may be preferably adjusted to 500 mass ppm or less.

Further, since Sn is more easily oxidized than Cu, it is considered that adverse influences such as forming an oxide in the copper foil and becoming a starting point of crack generation in the charge/discharge cycle test of the battery may happen. Therefore, Sn is preferable added to the molten metal of oxygen-free copper.

Incidentally, when the term "copper foil" alone is used in the present specification, the term "copper foil" also includes a copper alloy foil, and when "tough pitch copper" and "oxygen free copper" are used alone, they also include a copper alloy based on tough pitch copper or oxygen free copper.

Tensile Strength and Breaking Elongation of Rolled Copper Foil

One feature of the rolled copper foil according to the present embodiment, is that the tensile strength in the direction parallel to the rolling direction is 600 MPa or more, the breaking elongation in the direction parallel to the rolling direction is 2.0% or more, the tensile strength in the direction orthogonal to the rolling direction is 640 MPa or more, and the breaking elongation in the direction orthogonal to the rolling direction is 3.5% or more.

In prior arts, in a secondary battery in which a rolled copper foil is used as the negative electrode current collector, by increasing the breaking elongation in the rolling direction, the copper alloy foil stretches so as to follow the expansion of the negative electrode active material, even if the negative electrode active material expands at the time of charging the secondary battery.

However, even if a copper foil having a large elongation is used a the negative electrode current collector, cracks and breaks may occur in the copper foil due to charge and discharge. Specifically, as the active material expands and shrinks due to charging and discharging, the copper foil serving as the current collector is repeatedly subjected to stress concentration so that the current collector is partially bent and deformed, and due to charging and discharging, bending deformation is repeated. Bending deformation is caused by expansion and contraction of the active material, and bending and bending back are alternately repeated. Under such severe conditions, cracks and breaks tend to occur in the copper foil serving as the current collector, and conduction resistance increases and the cycle characteristics of the battery deteriorate in some cases.

Therefore, in the present embodiment, not only the breaking elongation but also the tensile strength are improved, so that the deformation of the rolled copper foil due to the stress is suppressed, and as a synergistic effect of improvement of both of tensile strength and breaking elongation, break of the rolled copper foil can be effectively suppressed. Furthermore, deformation due to expansion and contraction of the active material can happen in both the direction parallel to the rolling direction and the direction orthogonal to the rolling direction, so by increasing the tensile strength and breaking elongation in both directions, the rupture of the rolled copper foil is suppressed, and contribution to improvement of charge/discharge repetition characteristics and realization of high capacity of secondary battery, especially lithium ion battery can be expected.

From this viewpoint, the tensile strength in the direction parallel to the rolling direction is preferably 616 MPa or more, more preferably 620 MPa or more, still more preferably 625 MPa or more. The breaking elongation in the direction parallel to the rolling direction is preferably 2.3% or more, more preferably 2.4% or more, still more preferably 2.5% or more. The tensile strength in the direction orthogonal to the rolling direction is preferably 645 MPa or more, more preferably 650 MPa or more, and still more preferably 660 MPa or more. The breaking elongation in the direction orthogonal to the rolling direction is preferably 3.6% or more, more preferably 3.7% or more, still more preferably 3.8% or more. The reason for this is that, for example, it is required to maintain adhesion to the expansion and shrinkage of the active material to follow its deformation at the time of charge and discharge of the lithium ion secondary battery.

Further, another feature of the rolled copper foil according to the present embodiment, is that after a heat treatment at 200° C. for 60 minutes, the tensile strength in the direction parallel to the rolling direction is 600 MPa or more, the breaking elongation in the direction parallel to the rolling direction is 2.0% or more, the tensile strength in the direction orthogonal to the rolling direction is 640 MPa or more, and the breaking elongation in the direction orthogonal to the rolling direction is 3.5% or more That is, in manufacturing a secondary battery, a rolled copper foil is used as a current collector of a secondary battery to form an active material thin film thereon to prepare an electrode, and finally a secondary battery using this as an electrode. This manufacturing process is generally adopted. As a method of forming an active material thin film on a current collector, there is a method of applying a liquid containing an active material on a current collector and thereafter drying it. Here, tensile strength and breaking elongation of the rolled copper foil may be lowered by heating in the drying step after applying the active material on the copper foil. The present embodiment provides a rolled copper foil which can withstand deformation due to expansion and contraction of an active material even after such heating. Therefore, even after heat treatment at 200° C. for 60 minutes, which imitates such a heating. The copper foil shows less decrease in the tensile strength and breaking elongation in both directions of the direction parallel to the rolling direction and the direction orthogonal to the rolling direction.

0.2% Yield Strength

To satisfy standards required for a predetermined electronic material such as a connector, the 0.2% yield strength in the direction parallel to the rolling direction is preferably 480 MPa or more.

The 0.2% yield strength in the direction orthogonal to the rolling direction is preferably 510 MPa or more.

From the same viewpoint, it is preferable that after a heat treatment at 200° C. for 60 minutes, the 0.2% yield strength in the direction parallel to the rolling direction is 480 MPa or more and the 0.2% yield strength in the direction orthogonal to the rolling direction is 510 MPa or more.

The 0.2% yield strength is tested using a tensile tester according to IPC-TM-650 Test Method 2.4.18 and analyzed according to JIS Z2241.

Conductivity

Conductivity of the copper foil may be 75% IACS or higher, and thus it can be effectively used as an electronic material. Conductivity can be measured according to JIS H 0505. The conductivity is preferably 80% IACS or more.

Thickness of Rolled Copper Foil

The thickness of the rolled copper foil that can be used in the present embodiment is preferably 5 to 20 µm. There is no particular lower limit to the thickness of the copper foil, but if it is less than 5 µm, handling of the copper foil becomes poor, so it is preferably 5 µm or more. There is no particular upper limit on the thickness of the foil, but as the thickness increases, the energy density per unit weight of the battery decreases and the cost of the material also increases, so it is preferably 20 µm or less.

Tensile Strength and Breaking Elongation

In the present embodiment, the tensile strength refers to the value obtained by conducting a tensile strength test based on IPC-TM-650 Test Method 2.4.18 at room temperature (23° C.).

Breaking elongation refers to the elongation at break of a specimen when subjected to a tensile strength test based on IPC-TM-650 at room temperature (23° C.).

Breaking elongation (%)=$(L-L_0)/L_0 \times 100$ $L_0$: specimen length before test
L: specimen length at break.

Tensile strength after heat treatment at 200° C. for 60 minutes is measured after heating at 200° C. for 60 minutes and cooling the specimen to room temperature (23° C.). The value is obtained by conducting a tensile strength test based on IPC-TM-650 Test Method 2.4.18.

The breaking elongation after heat treatment at 200° C. for 60 minutes is after heating at 200° C. for 60 minutes and cooling the specimen to room temperature (23° C.). The elongation at break of the specimen when subjected to a tensile strength test based on IPC-TM-650 is obtained.

The tensile strength and breaking elongation in each of the direction parallel to the rolling direction and the direction orthogonal to the rolling direction are values obtained by conducting a tensile strength test based on IPC-TM-650 Test Method 2.4.18.

Manufacturing Method of Rolled Copper Foil

The rolled copper foil according to the present embodiment can be manufactured, for example, as follows.

After hot-rolling an ingot cast with a specified composition, oxides are removed by surface grinding and processed to a predetermined thickness in a step of final cold rolling to manufactured a copper foil. In the step of final cold rolling, the total working ratio should exceed 99.9%.

The total working ratio is calculated from the following formula. In the formula, $T_0$ is the thickness of the ingot before the step of final cold rolling, and T is the thickness of the rolled material (that is, the rolled copper foil) at the end of the cold rolling process in the step of final cold rolling.

Total working ratio (%)=$\{(T_0-T)/T_0\} \times 100$

By setting the total working ratio to more than 99.9%, the tensile strength and breaking elongation of the rolled copper foil are improved by work hardening, and rolled copper foil having high tensile strength and breaking elongation in both the direction parallel to the rolling direction and the direction orthogonal to the rolling direction can be obtained. In particular, tensile strength and breaking elongation after heat treatment at 200° C. for 60 minutes can be maintained at a high level.

During rolling, the material is repeatedly passed between a pair of rolls to reduce the thickness. At this time, passing the material once between the rolls is referred to as 1 pass. In order to roll at an appropriate strain rate for the purpose of increasing the tensile strength of the material, the working ratio of each pass is preferably 24% or more. When the working ratio of each pass is less than 24%, the strain rate is slow, sufficient tensile strength and 0.2% yield strength cannot be obtained and heat resistance is also low. The working ratio of each pass can be calculated from the following equation. In this formula, $T_{n-1}$ is the thickness of the ingot before rolling of the n-th pass, and $T_n$ is the thickness of the ingot at the end of the n-th pass.

Working ratio of each pass (%)=$\{(T_{n-1}-T_n)/T_{n-1}\} \times 100$

Furthermore, cold rolling and annealing can be performed on the ingot before the step of final cold rolling and after the step of hot rolling. By performing the annealing treatment, it is possible to further improve bending resistance.

In the step of final cold rolling, the working degree η in each rolling pass is defined as follows. In this formula, $T_0$ is the thickness of the ingot before the step of final cold rolling and $T_n$ is the thickness of the ingot at the end of the n-th pass $\eta = \ln(T_0/T_n)$ When η is high, the strength of the material is increased by work hardening, and in order to obtain the target foil thickness, it is necessary to apply a higher pressure to the material by using work rolls with smaller diameters. When the product of η and the diameter (mm) of the work roll exceeds 250, since the diameter of the work roll is large relative to the required pressure, it is difficult to obtain the pressure required for rolling and the load on the rolling mill is increased. Therefore, it is necessary to reduce the diameter of the work roll according to η in each pass.

Further, if the product of η and the diameter of the work roll exceeds 250, rolling becomes difficult. Therefore, by using a work roll having a smaller diameter in accordance with η and rolling the material, a larger pressure is given to the material, so that the rolling process can be further advanced to realize a further high rolling reduction ratio. In addition, by rolling with a work roll having a small roll diameter, the occurrence of shear band can be suppressed. The shear zone is a structure in which deformation is locally concentrated, that is, a portion where dislocation density is increased due to the accumulation of many strains, and it is difficult to deform compared to surrounding tissues, so that elongation characteristics deteriorates when a shear zone occurs in the material. However, since the frequency of maintenance is higher as the diameter of the work roll becomes smaller, from the viewpoint of productivity, the lower limit value of the product of η and the diameter of the work roll is preferably 40, and the upper limit value is preferably 250.

FIG. 1 and FIG. 2 show the effect of the method for manufacturing a rolled copper foil according to the present embodiment. The tensile strength (TS) and breaking elongation of the present embodiment, in which the total working ratio in the step of final cold rolling are changed, and those of a prior art are described. In these figures, the total working ratio in the step of final cold rolling of the present embodiment and the prior art are over 99.9% and 99%, respectively, and the other manufacturing conditions are the same. According to FIG. 1 and FIG. 2, by setting the total working ratio in the step of final cold rolling to exceed 99.9%, it is possible to improve the tensile strength and breaking elongation in both the direction parallel to the rolling direction and the direction orthogonal to the rolling direction.

EXAMPLES

Hereinafter, rolled copper foils of the present embodiment were prototyped and their performance was evaluated as described below. However, the descriptions of the following examples and comparative examples are merely specific examples for facilitating understanding of the technical contents of the present invention and the technical scope of the present invention is not limited by these specific examples.

First, an ingot having a composition of Cu and 0.12 mass % Sn was prepared by melting, and this ingot was hot rolled at 900° C. to obtain a plate. Thereafter, a rolled copper foil was obtained by a step of final cold rolling under each pass condition of A to N shown in Tables 1-1 to 1-4. In the tables, "-" indicates that the rolling is not processed.

For each of the test pieces thus obtained, the following characteristics were evaluated. The results are shown in Tables 2-1 and 2-2.

0.2% Yield Strength

A test piece of 100 mm in the longitudinal direction and 12.7 mm in the width direction was prepared and subjected to a tensile test in the direction parallel to the rolling direction by a tensile tester in accordance with IPC-TM-650 Test Method 2.4.18, and 0.2% yield strength was analyzed in accordance with JIS Z 2241.

Conductivity

A test piece was taken so that the longitudinal direction of the test piece was parallel to the rolling direction, and the conductivity (EC: % IACS) was measured by a four-terminal method in accordance with JIS H 0505.

Tensile Strength

A test piece of 100 mm in the longitudinal direction and 12.7 mm in the width direction was prepared and subjected to a tensile test in the direction parallel to the rolling direction by a tensile tester in accordance with IPC-TM-650 Test Method 2.4.18, and tensile strength was measured.

Breaking Elongation

A test piece of 100 mm in the longitudinal direction and 12.7 mm in the width direction was prepared, and marked at intervals of 5 mm using a stamp, and then subjected to a tensile test in the direction parallel to the rolling direction by a tensile tester in accordance with IPC-TM-650 Test Method 2.4.18. The breaking elongation was measured by measuring the interval of the marks of the portion including the rupture portion of the test piece after rupture.

Evaluation of Characteristics of Secondary Battery

Characteristics of secondary batteries formed by using each rolled copper foil of each Example and Comparative example were evaluated. Specifically, as a characteristic of the secondary battery, the presence or absence of a broken portion of the negative electrode was evaluated.

Preparation of Negative Electrode

First, a negative electrode active material layer was formed on one of the main surfaces of each rolled copper foil of each Example and Comparative Example, and a negative electrode was prepared. Specifically, 45 parts by mass of scaly graphite powder and 5 parts by mass of silicon monoxide (SIO) as anode active material, 2 parts by mass of SBR as a binder, 20 mass parts of thickener water solution, were kneaded and dispersed to form a slurry (paste) of the negative electrode active material layer. The thickener water solution was prepared by dissolving 99 parts by mass of water with respect to 1 part by mass of CMC as a thickener. Subsequently, the slurry for the negative electrode active material layer was applied by a doctor blade method to either main surface (one side) of each of the rolled copper foils of Example and Comparative Example so as to have a thickness of 100 μm. Thereafter, each of the rolled copper foils of Examples and Comparative Examples coated with the slurry for the anode active material layer was heated at 200° C. for 60 minutes and dried. Thereby, a negative electrode active material layer having a thickness of 100 μm was formed on each rolled copper foil of each Example and Comparative Example. Then, the negative electrode active material layer was pressed to adjust the thickness of the negative electrode active material layer to 50 μm. Thereafter, a laminate of the rolled copper foil and the negative electrode active material layer was punched to prepare a negative electrode (negative electrode plate) of a predetermined shape.

Preparation of Secondary Battery

A positive electrode plate (positive electrode) used for a secondary battery was prepared. Specifically, 50 parts by mass of $LiCoO_2$ powder as a positive electrode active material, 1 part by mass of acetylene black as a conductive aid, and 5 parts by mass of PVDF as a binder are dissolved in water (solvent) and kneaded and dispersed to form a slurry (paste) for the positive electrode active material layer. Subsequently, the slurry for the positive electrode active material layer was applied by a doctor blade method to either main surface (one side) of an aluminum foil having a thickness of 20 μm as the positive electrode current collector. The slurry was applied so as to have a thickness of 100 μm. Thereafter, the aluminum foil coated with the slurry for the positive electrode active material layer was heated at 120° C. for 1 hour and dried. As a result, a positive electrode active material layer having a thickness of 100 μm was formed on the aluminum foil. Then, the thickness of the positive electrode active material layer was adjusted to 50 μm by pressing the positive electrode active material layer. Thereafter, a laminate of the aluminum foil and the positive electrode active material layer was punched to prepare a positive electrode (positive electrode plate) having a predetermined shape.

A coin cell type lithium ion secondary battery was fabricated using each negative electrode using each rolled copper foil of each Example and Comparative Example, a positive electrode, a separator, and an electrolytic solution. More particularly, the negative electrode active material layer included in each negative electrode and the positive electrode active material layer included in the positive electrode were arranged to face each other. A separator made of a polypropylene resin porous film having a thickness of 20 μm was sandwiched between the negative electrode active material layer and the positive electrode active material layer to prepare a laminate of the negative electrode, the positive electrode, and the separator. Then, the laminate of the negative electrode, the positive electrode, and the separator was accommodated in a coin type container (cell), and the positive electrode and the negative electrode were electrically connected to terminals inside the cell, respectively. Thereafter, an electrolytic solution, in which 1 mol/L of $LiPF_6$ as an electrolyte and 1% by mass of VC as an additive were dissolved in a mixed solvent produced by mixing 30 vol % of EC, 50 vol % of MEC, and 20 vol % of methyl propionate, was injected into the cell, and the cell was sealed to eventually prepare a secondary battery.

Evaluation on the Presence or Absence of Break Point

Regarding each secondary battery formed by using each rolled copper foil of each Example and Comparative Example, after charging and discharging the secondary battery, the portion where the breakage occurred in the rolled copper foil was visually confirmed. Specifically, after charging and discharging were alternately performed 50 times at 25° C., the presence or absence of breakage of the rolled copper foil was visually confirmed.

Evaluation of Cycle Characteristics

For each of the secondary batteries formed using each of the rolled copper foils of the respective Examples and Comparative Examples, the capacity retention rate after charging and discharging of the secondary battery was measured. Specifically, charging and discharging are performed under the condition of 25° C., and the ratio of the discharge capacity at the 50th cycle to the discharge capacity at the 2nd cycle, that is, (discharge capacity at the 50th cycle/discharge capacity at the 2nd cycle)×100 was calculated. At that time, charging was carried out until the battery voltage reached 4.2 V at a constant current density of 1 $mA/cm^2$, and thereafter the current density reached 0.05 $mA/cm^2$ at a constant voltage of 4.2 V. Discharge was carried out at a constant current density of 1 $mA/cm^2$ until the battery voltage reached 2.5 V. Besides, when charging was performed, the utilization factor of the capacity of the negative electrode was set to 90% so that metallic lithium was not deposited on the negative electrode. The measured results of the capacity retention rate are shown in Tables 2-1 and 2-2. Evaluations for the capacity retention rate are shown in Tables 2-1 and 2-2. As evaluation, double circle is particularly good, circle is good, and "X" is poor.

Evaluation Results

From Examples 1 to 15, rolled copper foils having predetermined heat resistance and having a predetermined breaking elongation after performing a predetermined heat treatment, when used as a negative electrode current collector of a secondary battery, it was confirmed that rupture due to charging/discharging of the rolled copper foil can be suppressed. For example, after a heat treatment at 200° C. for 60 minutes, when the tensile strength in a direction parallel to the rolling direction is 600 MPa or more, the breaking elongation in the direction parallel to the rolling direction is 2.0% or more, the tensile strength in a direction orthogonal to the rolling direction is 640 MPa or more, and the breaking elongation in the direction orthogonal to the rolling direction is 3.5% or more, it was confirmed that in the secondary battery using such rolled copper foil as the negative electrode current collector, the rupture of the rolled copper foil was suppressed, even if the secondary battery was repeatedly charged and discharged.

That is, since the rolled copper foil after the predetermined heat treatment has a predetermined tensile strength and breaking elongation, it was confirmed that the rolled copper foil could be prevented from breaking by the stress generated by the volume change of the negative electrode active material when charging and discharging the secondary battery causes rolled copper. Therefore, it was confirmed that rupture of the rolled copper foil can be suppressed.

TABLE 1-1

| | A | | | | B | | | | C | | | | D | | | |
|---|---|---|---|---|---|---|---|---|---|---|---|---|---|---|---|---|
| | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r |
| pass 1 | 40.2 | 0.51 | 90 | 46 | 47.1 | 0.64 | 90 | 57 | 45.2 | 0.60 | 90 | 54 | 48.2 | 0.66 | 90 | 59 |
| pass 2 | 34.5 | 0.94 | 90 | 84 | 33 | 1.04 | 90 | 93 | 45.3 | 1.20 | 90 | 108 | 48 | 1.31 | 90 | 118 |
| pass 3 | 35.7 | 1.38 | 90 | 124 | 33.7 | 1.45 | 90 | 130 | 34.8 | 1.63 | 90 | 147 | 41 | 1.84 | 90 | 166 |
| pass 4 | 34.2 | 1.80 | 90 | 162 | 33.9 | 1.86 | 90 | 168 | 34.9 | 2.06 | 90 | 186 | 40.6 | 2.36 | 90 | 212 |
| pass 5 | 33.2 | 2.20 | 90 | 198 | 33.8 | 2.27 | 90 | 205 | 30.5 | 2.43 | 90 | 218 | 40.5 | 2.88 | 60 | 173 |
| pass 6 | 34 | 2.62 | 90 | 235 | 34 | 2.69 | 90 | 242 | 30 | 2.78 | 60 | 167 | 39.7 | 3.39 | 60 | 203 |
| pass 7 | 34.6 | 3.04 | 60 | 182 | 34.6 | 3.11 | 60 | 187 | 33.1 | 3.18 | 60 | 191 | 34.5 | 3.81 | 60 | 229 |
| pass 8 | 32.3 | 3.43 | 60 | 206 | 32.3 | 3.50 | 60 | 210 | 32.4 | 3.58 | 60 | 215 | 34.4 | 4.23 | 45 | 190 |
| pass 9 | 32.6 | 3.83 | 60 | 230 | 32.6 | 3.90 | 60 | 234 | 30.5 | 3.94 | 60 | 236 | 34.5 | 4.65 | 45 | 209 |
| pass 10 | 31.2 | 4.20 | 45 | 189 | 33.1 | 4.30 | 45 | 194 | 30.7 | 4.31 | 45 | 194 | 34.4 | 5.07 | 45 | 228 |
| pass 11 | 31.4 | 4.58 | 45 | 206 | 33.4 | 4.71 | 45 | 212 | 30.3 | 4.67 | 45 | 210 | 34.1 | 5.49 | 30 | 165 |
| pass 12 | 31.3 | 4.95 | 45 | 223 | 33.5 | 5.12 | 45 | 230 | 34.9 | 5.10 | 45 | 229 | 33.9 | 5.91 | 30 | 177 |
| pass 13 | 31.2 | 5.32 | 45 | 240 | 34.1 | 5.53 | 45 | 249 | 35 | 5.53 | 45 | 249 | 33.8 | 6.32 | 30 | 190 |
| pass 14 | 31.1 | 5.70 | 30 | 171 | 33.6 | 5.94 | 35 | 208 | 35 | 5.96 | 30 | 179 | 34.7 | 6.74 | 30 | 202 |
| pass 15 | 30.9 | 6.07 | 30 | 182 | 33.4 | 6.35 | 35 | 222 | 35.2 | 6.39 | 30 | 192 | 34.8 | 7.17 | 30 | 215 |
| pass 16 | 31.4 | 6.44 | 30 | 193 | 32.94 | 6.75 | 35 | 236 | 35.3 | 6.83 | 30 | 205 | 27.7 | 7.50 | 30 | 225 |
| pass 17 | 32.1 | 6.83 | 30 | 205 | 33.6 | 7.16 | 30 | 215 | 35.3 | 7.26 | 30 | 218 | 24 | 7.77 | 30 | 233 |
| pass 18 | 32.3 | 7.22 | 30 | 217 | 35.8 | 7.60 | 30 | 228 | 35.5 | 7.70 | 30 | 231 | 24.1 | 8.05 | 30 | 241 |
| pass 19 | 33.5 | 7.63 | 30 | 229 | — | — | — | — | 34.9 | 8.13 | 30 | 244 | — | — | — | — |
| pass 20 | 34.3 | 8.05 | 30 | 241 | — | — | — | — | — | — | — | — | — | — | — | — |
| pass 21 | — | — | — | — | — | — | — | — | — | — | — | — | — | — | — | — |
| pass 22 | — | — | — | — | — | — | — | — | — | — | — | — | — | — | — | — |
| pass 23 | — | — | — | — | — | — | — | — | — | — | — | — | — | — | — | — |
| Maximum working ratio (%) | 40.2 | | | | 47.1 | | | | 45.3 | | | | 48.2 | | | |
| Minimum working ratio (%) | 30.9 | | | | 32.3 | | | | 30 | | | | 24 | | | |
| Thickness before rolling (mm) | 25 | | | | 16 | | | | 17 | | | | 25 | | | |
| Thickness after rolling (mm) | 0.008 | | | | 0.008 | | | | 0.0051 | | | | 0.008 | | | |
| Total working ratio (%) | 99.97 | | | | 99.95 | | | | 99.97 | | | | 99.97 | | | |

TABLE 1-2

| | E | | | | F | | | | G | | | | H | | | |
|---|---|---|---|---|---|---|---|---|---|---|---|---|---|---|---|---|
| | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r |
| pass 1 | 47 | 0.63 | 90 | 57 | 48 | 0.65 | 90 | 59 | 37.1 | 0.46 | 90 | 42 | 36.2 | 1.96 | 90 | 177 |
| pass 2 | 47.5 | 1.28 | 90 | 115 | 47.1 | 1.29 | 90 | 116 | 35.1 | 0.90 | 90 | 81 | 31.5 | 2.34 | 90 | 211 |
| pass 3 | 35.5 | 1.72 | 90 | 155 | 37.5 | 1.76 | 90 | 158 | 35.1 | 1.33 | 90 | 120 | 31.7 | 2.72 | 90 | 245 |
| pass 4 | 35.6 | 2.16 | 90 | 194 | 37.6 | 2.23 | 90 | 201 | 32.6 | 1.72 | 90 | 155 | 31.2 | 3.10 | 60 | 186 |
| pass 5 | 35.5 | 2.60 | 90 | 234 | 37.5 | 2.70 | 90 | 243 | 32.4 | 2.11 | 90 | 190 | 30.4 | 3.46 | 60 | 208 |
| pass 6 | 35 | 3.03 | 60 | 182 | 37 | 3.16 | 60 | 190 | 32 | 2.50 | 90 | 225 | 30 | 3.82 | 60 | 229 |
| pass 7 | 34.4 | 3.46 | 60 | 207 | 37.1 | 3.63 | 60 | 218 | 32.1 | 2.89 | 60 | 173 | 33.3 | 4.22 | 45 | 190 |
| pass 8 | 35 | 3.88 | 60 | 233 | 37.2 | 4.09 | 60 | 246 | 32.3 | 3.28 | 60 | 197 | 33.5 | 4.63 | 45 | 208 |
| pass 9 | 35.5 | 4.32 | 45 | 194 | 37.5 | 4.56 | 45 | 205 | 32.4 | 3.67 | 60 | 220 | 33.4 | 5.04 | 45 | 227 |
| pass 10 | 35 | 4.75 | 45 | 214 | 37.5 | 5.03 | 45 | 226 | 32.6 | 4.06 | 60 | 244 | 33.6 | 5.45 | 45 | 245 |
| pass 11 | 35.1 | 5.18 | 45 | 233 | 36.1 | 5.48 | 45 | 247 | 32.4 | 4.45 | 45 | 200 | 27.4 | 5.77 | 30 | 173 |
| pass 12 | 36 | 5.63 | 30 | 169 | 36.2 | 5.93 | 30 | 178 | 32.8 | 4.85 | 45 | 218 | 26.1 | 6.07 | 30 | 182 |
| pass 13 | 33.3 | 6.03 | 30 | 181 | 35.5 | 6.37 | 30 | 191 | 32.5 | 5.24 | 45 | 236 | 25.7 | 6.36 | 30 | 191 |
| pass 14 | 33.3 | 6.44 | 30 | 193 | 33.3 | 6.77 | 30 | 203 | 30.3 | 5.60 | 30 | 168 | 25.3 | 6.66 | 30 | 200 |
| pass 15 | 33.5 | 6.85 | 30 | 205 | 33.5 | 7.18 | 30 | 215 | 33 | 6.00 | 30 | 180 | 24.4 | 6.94 | 30 | 208 |
| pass 16 | 33.5 | 7.25 | 30 | 218 | 33.5 | 7.59 | 30 | 228 | 33.5 | 6.41 | 30 | 192 | 24.2 | 7.21 | 30 | 216 |
| pass 17 | 33.5 | 7.66 | 30 | 230 | 33.3 | 7.99 | 30 | 240 | 33.5 | 6.82 | 30 | 205 | 24.3 | 7.49 | 30 | 225 |
| pass 18 | 34.6 | 8.09 | 30 | 243 | 33.3 | 8.40 | 27 | 227 | 30.1 | 7.18 | 30 | 215 | 24.3 | 7.77 | 30 | 233 |
| pass 19 | — | — | — | — | 33.3 | 8.80 | 27 | 238 | 25.4 | 7.47 | 30 | 224 | 24.2 | 8.05 | 30 | 241 |
| pass 20 | — | — | — | — | 33.3 | 9.21 | 27 | 249 | 25.4 | 7.76 | 30 | 233 | — | — | — | — |
| pass 21 | — | — | — | — | — | — | — | — | 24.8 | 8.05 | 30 | 241 | — | — | — | — |
| pass 22 | — | — | — | — | — | — | — | — | — | — | — | — | — | — | — | — |
| pass 23 | — | — | — | — | — | — | — | — | — | — | — | — | — | — | — | — |
| Maximum working ratio (%) | 47.5 | | | | 48 | | | | 37.1 | | | | 36.2 | | | |
| Minimum working ratio (%) | 33.3 | | | | 33.3 | | | | 24.8 | | | | 24.2 | | | |
| Thickness before rolling (mm) | 65 | | | | 80 | | | | 25 | | | | 5.5 | | | |
| Thickness after rolling (mm) | 0.0198 | | | | 0.008 | | | | 0.008 | | | | 0.008 | | | |
| Total working ratio (%) | 99.97 | | | | 99.99 | | | | 99.97 | | | | 99.85 | | | |

TABLE 1-3

| | I | | | | J | | | | K | | | | L | | | |
|---|---|---|---|---|---|---|---|---|---|---|---|---|---|---|---|---|
| | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r |
| pass 1 | 45.9 | 0.61 | 90 | 55 | 38.6 | 0.49 | 90 | 44 | 49.9 | 0.69 | 90 | 62 | 40.1 | 1.55 | 90 | 139 |
| pass 2 | 43.1 | 1.18 | 90 | 106 | 38.6 | 0.98 | 90 | 88 | 49.5 | 1.37 | 90 | 124 | 39.5 | 2.05 | 90 | 184 |
| pass 3 | 43.6 | 1.75 | 90 | 158 | 35.5 | 1.41 | 90 | 127 | 45.5 | 1.98 | 90 | 178 | 33.5 | 2.46 | 90 | 221 |
| pass 4 | 34.1 | 2.17 | 90 | 195 | 33.3 | 1.82 | 90 | 164 | 45.6 | 2.59 | 90 | 233 | 34.1 | 2.87 | 60 | 172 |

TABLE 1-3-continued

| | I | | | | J | | | | K | | | | L | | | |
|---|---|---|---|---|---|---|---|---|---|---|---|---|---|---|---|---|
| | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r | Working ratio of each rolling pass (%) | Working degree η | roll diameter r(mm) | η × r |
| pass 5 | 34.6 | 2.59 | 90 | 233 | 33.6 | 2.23 | 90 | 201 | 34.6 | 3.02 | 60 | 181 | 33.5 | 3.28 | 60 | 197 |
| pass 6 | 35 | 3.02 | 60 | 181 | 33.4 | 2.63 | 90 | 237 | 35.5 | 3.46 | 60 | 207 | 33.3 | 3.69 | 60 | 221 |
| pass 7 | 34.7 | 3.45 | 60 | 207 | 35.5 | 3.07 | 60 | 184 | 35.8 | 3.90 | 60 | 234 | 34.8 | 4.11 | 60 | 247 |
| pass 8 | 33.6 | 3.86 | 60 | 232 | 33.3 | 3.48 | 60 | 209 | 36.1 | 4.35 | 45 | 196 | 33.6 | 4.52 | 45 | 204 |
| pass 9 | 33.1 | 4.26 | 45 | 192 | 34.1 | 3.90 | 60 | 234 | 36.6 | 4.80 | 45 | 216 | 34.1 | 4.94 | 45 | 222 |
| pass 10 | 33.3 | 4.67 | 45 | 210 | 31 | 4.27 | 45 | 192 | 36.2 | 5.25 | 45 | 236 | 34.6 | 5.36 | 45 | 241 |
| pass 11 | 32.6 | 5.06 | 45 | 228 | 31.9 | 4.65 | 45 | 209 | 36.8 | 5.71 | 30 | 171 | 33.2 | 5.77 | 30 | 173 |
| pass 12 | 32.9 | 5.46 | 45 | 246 | 32.8 | 5.05 | 45 | 227 | 36.6 | 6.17 | 30 | 185 | 34.1 | 6.19 | 30 | 186 |
| pass 13 | 32.8 | 5.86 | 30 | 176 | 31.9 | 5.43 | 45 | 244 | 36.9 | 6.63 | 30 | 199 | 33.3 | 6.59 | 30 | 198 |
| pass 14 | 32.3 | 6.25 | 30 | 187 | 31.2 | 5.81 | 30 | 174 | 37.3 | 7.09 | 30 | 213 | 30.3 | 6.95 | 30 | 209 |
| pass 15 | 33.3 | 6.65 | 30 | 200 | 31.8 | 6.19 | 30 | 186 | 37.9 | 7.57 | 30 | 227 | 30.5 | 7.31 | 30 | 219 |
| pass 16 | 33.5 | 7.06 | 30 | 212 | 30.1 | 6.55 | 30 | 196 | 37.9 | 8.05 | 30 | 241 | 30.8 | 7.68 | 30 | 230 |
| pass 17 | 30 | 7.42 | 30 | 222 | 30.8 | 6.92 | 30 | 207 | — | — | — | — | 30.5 | 8.05 | 30 | 241 |
| pass 18 | — | — | — | — | 29.3 | 7.26 | 30 | 218 | — | — | — | — | — | — | — | — |
| pass 19 | — | — | — | — | — | — | — | — | — | — | — | — | — | — | — | — |
| pass 20 | — | — | — | — | — | — | — | — | — | — | — | — | — | — | — | — |
| pass 21 | — | — | — | — | — | — | — | — | — | — | — | — | — | — | — | — |
| pass 22 | — | — | — | — | — | — | — | — | — | — | — | — | — | — | — | — |
| pass 23 | — | — | — | — | — | — | — | — | — | — | — | — | — | — | — | — |
| Maximum working ratio (%) | 45.9 | | | | 38.6 | | | | 49.9 | | | | 40.1 | | | |
| Minimum working ratio (%) | 30 | | | | 29.3 | | | | 34.8 | | | | 30.3 | | | |
| Thickness before rolling (mm) | 13.3 | | | | 11.4 | | | | 25 | | | | 8.9 | | | |
| Thickness after rolling (mm) | 0.008 | | | | 0.008 | | | | 0.008 | | | | 0.008 | | | |
| Total working ratio (%) | 99.94 | | | | 99.93 | | | | 99.97 | | | | 99.91 | | | |

TABLE 1-4

| | M | | | | N | | | |
|---|---|---|---|---|---|---|---|---|
| | Working ratio of each rolling pass (%) | Working degree η | roll diameter r(mm) | η × r | Working ratio of each rolling pass (%) | Working degree η | roll diameter r(mm) | η × r |
| pass 1 | 49.1 | 0.68 | 90 | 61 | 41.7 | 0.54 | 90 | 49 |
| pass 2 | 47.8 | 1.33 | 90 | 119 | 35.5 | 0.98 | 90 | 88 |
| pass 3 | 42 | 1.87 | 90 | 168 | 37.4 | 1.45 | 90 | 130 |
| pass 4 | 40.9 | 2.40 | 90 | 216 | 35.9 | 1.89 | 90 | 170 |
| pass 5 | 40.5 | 2.92 | 90 | 262 | 33.6 | 2.30 | 90 | 138 |
| pass 6 | 35.5 | 3.35 | 60 | 201 | 35.5 | 2.74 | 60 | 164 |
| pass 7 | 34.5 | 3.78 | 60 | 227 | 35.1 | 3.17 | 60 | 190 |
| pass 8 | 34.4 | 4.20 | 60 | 252 | 33.4 | 3.58 | 60 | 215 |
| pass 9 | 34.5 | 4.62 | 45 | 208 | 33.6 | 3.99 | 60 | 239 |
| pass 10 | 34.4 | 5.04 | 45 | 227 | 30.2 | 4.35 | 45 | 196 |
| pass 11 | 34.1 | 5.46 | 45 | 246 | 30.4 | 4.71 | 45 | 212 |
| pass 12 | 32.8 | 5.86 | 30 | 176 | 30.2 | 5.07 | 45 | 228 |
| pass 13 | 24.1 | 6.13 | 30 | 184 | 26.2 | 5.37 | 45 | 242 |
| pass 14 | 24.1 | 6.41 | 30 | 192 | 23.9 | 5.65 | 30 | 169 |
| pass 15 | 24.5 | 6.69 | 30 | 201 | 23.8 | 5.92 | 30 | 178 |
| pass 16 | 33.3 | 7.10 | 30 | 213 | 31.4 | 6.29 | 30 | 189 |
| pass 17 | 24.2 | 7.37 | 30 | 221 | 32.1 | 6.68 | 30 | 200 |
| pass 18 | 26.5 | 7.68 | 30 | 230 | 22.9 | 6.94 | 30 | 208 |
| pass 19 | 31.3 | 8.06 | 30 | 242 | 23.8 | 7.21 | 30 | 216 |
| pass 20 | — | — | — | — | 24.3 | 7.49 | 30 | 225 |
| pass 21 | — | — | — | — | 24.5 | 7.77 | 30 | 233 |
| pass 22 | — | — | — | — | 23.9 | 8.05 | 30 | 241 |

TABLE 1-4-continued

| | M | | | N | | |
|---|---|---|---|---|---|---|
| | Working ratio of each rolling pass (%) | Working degree η | roll diameter r(mm) η × r | Working ratio of each rolling pass (%) | Working degree η | roll diameter r(mm) η × r |
| pass 23 | — | — | — | — | — | — |
| Maximum working ratio (%) | | 49.1 | | | 41.7 | |
| Minimum working ratio (%) | | 24.1 | | | 22.9 | |
| Thickness | | 25 | | | 25 | |

TABLE 1-4-continued

| | M | | | N | | |
|---|---|---|---|---|---|---|
| | Working ratio of each rolling pass (%) | Working degree η | roll diameter r(mm) η × r | Working ratio of each rolling pass (%) | Working degree η | roll diameter r(mm) η × r |
| before rolling (mm) | | | | | | |
| Thickness after rolling (mm) | | 0.008 | | | 0.008 | |
| Total working ratio (%) | | 99.97 | | | 99.97 | |

TABLE 2-1

| | No. | Sn concentration (mass %) | Ag concentration (mass %) | Total (mass %) | Total working ratio in step of final colding rolling (%) | pass condition | amount of passes | minimun working ratio of each pass (%) | product plate thickness |
|---|---|---|---|---|---|---|---|---|---|
| Example | 1 | 0.051 | 0.000 | 0.051 | 99.97 | A | 20 | 30.9 | 0.0080 |
| Example | 2 | 0.197 | 0.000 | 0.198 | 99.97 | G | 21 | 24.8 | 0.0080 |
| Example | 3 | 0.120 | 0.000 | 0.120 | 99.91 | L | 17 | 30.3 | 0.0080 |
| Example | 4 | 0.120 | 0.000 | 0.120 | 99.99 | F | 20 | 33.3 | 0.0080 |
| Example | 5 | 0.120 | 0.000 | 0.120 | 99.97 | K | 16 | 34.8 | 0.0080 |
| Example | 6 | 0.120 | 0.000 | 0.120 | 99.97 | G | 21 | 24.8 | 0.0080 |
| Example | 7 | 0.120 | 0.000 | 0.120 | 99.97 | D | 18 | 24.0 | 0.0080 |
| Example | 8 | 0.120 | 0.000 | 0.120 | 99.97 | C | 19 | 30.0 | 0.0051 |
| Example | 9 | 0.120 | 0.000 | 0.120 | 99.97 | E | 18 | 33.3 | 0.0198 |
| Example | 10 | 0.120 | 0.000 | 0.120 | 99.93 | J | 18 | 29.3 | 0.0080 |
| Example | 11 | 0.120 | 0.000 | 0.120 | 99.95 | B | 18 | 32.3 | 0.0080 |
| Example | 12 | 0.100 | 0.000 | 0.100 | 99.94 | I | 17 | 30.0 | 0.0080 |
| Example | 13 | 0.141 | 0.000 | 0.141 | 99.97 | G | 21 | 24.8 | 0.0080 |
| Example | 14 | 0.200 | 0.010 | 0.210 | 99.97 | D | 18 | 24.0 | 0.0080 |
| Example | 15 | 0.200 | 0.100 | 0.300 | 99.97 | D | 18 | 24.0 | 0.0080 |
| Comparative Example | 1 | 0.048 | 0.000 | 0.048 | 99.97 | D | 18 | 24.0 | 0.0080 |
| Comparative Example | 2 | 0.205 | 0.000 | 0.205 | 99.97 | G | 21 | 24.8 | 0.0080 |
| Comparative Example | 3 | 0.120 | 0.000 | 0.120 | 99.85 | H | 19 | 24.2 | 0.0080 |
| Comparative Example | 4 | 0.120 | 0.000 | 0.12 | 99.97 | M | 19 | 24.1 | 0.0080 |
| Comparative Example | 5 | 0.120 | 0.000 | 0.12 | 99.97 | N | 22 | 22.9 | 0.0080 |

TABLE 2-2

| | | Before heating | | | | | | | After heating at 200° C. for 60 minutes | |
|---|---|---|---|---|---|---|---|---|---|---|
| | | Tensile strength (MPa) | | 0.2% yield strength (MPa) | | Breaking elongation (%) | | | Tensile strength (MPa) | |
| | No. | Rolling parallel direction | Rolling orthogonal direction | Rolling parallel direction | Rolling orthogonal direction | Rolling parallel direction | Rolling orthogonal direction | Conductivity (%) | Rolling parallel direction | Rolling orthogonal direction |
| Example | 1 | 602 | 641 | 482 | 513 | 2.8 | 4.3 | 94.9 | 601 | 640 |
| Example | 2 | 652 | 698 | 522 | 558 | 2.1 | 3.5 | 80.1 | 652 | 701 |

TABLE 2-2-continued

| | No. | | | | | | | | | |
|---|---|---|---|---|---|---|---|---|---|---|
| Example | 3 | 628 | 665 | 502 | 532 | 2.5 | 3.8 | 80.4 | 627 | 665 |
| Example | 4 | 660 | 699 | 528 | 559 | 2.3 | 4.0 | 80.5 | 659 | 697 |
| Example | 5 | 625 | 661 | 500 | 529 | 2.3 | 4.0 | 80.3 | 624 | 659 |
| Example | 6 | 620 | 655 | 496 | 524 | 2.2 | 3.8 | 80.4 | 619 | 655 |
| Example | 7 | 644 | 682 | 515 | 546 | 2.2 | 3.7 | 80.6 | 625 | 658 |
| Example | 8 | 651 | 690 | 521 | 552 | 2.0 | 3.5 | 80.4 | 650 | 689 |
| Example | 9 | 649 | 686 | 519 | 549 | 3.0 | 4.5 | 80.3 | 649 | 684 |
| Example | 10 | 631 | 666 | 505 | 533 | 2.3 | 3.9 | 80.5 | 630 | 666 |
| Example | 11 | 639 | 677 | 511 | 542 | 2.3 | 4.0 | 80.4 | 639 | 675 |
| Example | 12 | 620 | 655 | 496 | 524 | 2.6 | 3.9 | 93.1 | 618 | 651 |
| Example | 13 | 639 | 649 | 511 | 519 | 2.4 | 3.8 | 80.2 | 638 | 650 |
| Example | 14 | 652 | 691 | 522 | 553 | 2.1 | 3.7 | 80.5 | 649 | 687 |
| Example | 15 | 661 | 697 | 529 | 558 | 2.2 | 3.6 | 80.2 | 658 | 695 |
| Comparative Example | 1 | 595 | 587 | 476 | 470 | 2.8 | 4.5 | 95.2 | 590 | 571 |
| Comparative Example | 2 | 667 | 695 | 534 | 556 | 2.1 | 2.7 | 74.9 | 665 | 693 |
| Comparative Example | 3 | 606 | 638 | 485 | 510 | 2.6 | 4.3 | 80.1 | 600 | 630 |
| Comparative Example | 4 | 615 | 639 | 492 | 511 | 2.0 | 2.3 | 80.3 | 610 | 632 |
| Comparative Example | 5 | 616 | 637 | 493 | 510 | 2.3 | 4.0 | 80.5 | 601 | 608 |

| | | After heating at 200° C. for 60 minutes | | | | | | After charging and discharging cycles | |
|---|---|---|---|---|---|---|---|---|---|
| | | 0.2% yield strength (MPa) | | Breaking elongation (%) | | Conductivity (%) | Presence of break | Cycle characteristics Capacity retention rate (%) | Evaluation |
| | No. | Rolling parallel direction | Rolling orthogonal direction | Rolling parallel direction | Rolling orthogonal direction | | | | |
| Example | 1 | 481 | 512 | 2.2 | 6.0 | 95.4 | no | 68 | ○ |
| Example | 2 | 522 | 561 | 2.4 | 3.8 | 80.3 | no | 88 | ⊚ |
| Example | 3 | 502 | 532 | 2.2 | 3.9 | 80.4 | no | 76 | ⊚ |
| Example | 4 | 527 | 558 | 2.7 | 4.4 | 80.6 | no | 95 | ⊚ |
| Example | 5 | 499 | 527 | 2.3 | 3.9 | 80.5 | no | 80 | ⊚ |
| Example | 6 | 495 | 524 | 2.7 | 4.3 | 80.4 | no | 88 | ⊚ |
| Example | 7 | 500 | 526 | 2.5 | 3.9 | 80.8 | no | 85 | ⊚ |
| Example | 8 | 520 | 551 | 2.0 | 3.5 | 80.4 | no | 65 | ○ |
| Example | 9 | 519 | 547 | 3.0 | 4.6 | 80.3 | no | 93 | ⊚ |
| Example | 10 | 504 | 533 | 2.2 | 3.9 | 80.6 | no | 70 | ○ |
| Example | 11 | 511 | 540 | 2.3 | 3.8 | 80.4 | no | 71 | ○ |
| Example | 12 | 494 | 521 | 2.6 | 4.0 | 94.0 | no | 78 | ⊚ |
| Example | 13 | 510 | 520 | 2.2 | 3.8 | 80.3 | no | 66 | ○ |
| Example | 14 | 519 | 550 | 2.4 | 3.8 | 80.7 | no | 84 | ⊚ |
| Example | 15 | 526 | 556 | 2.6 | 3.8 | 80.4 | no | 86 | ⊚ |
| Comparative Example | 1 | 472 | 457 | 2.9 | 4.7 | 95.4 | yes | 39 | X |
| Comparative Example | 2 | 532 | 554 | 2.2 | 2.9 | 75.3 | no | 53 | X |
| Comparative Example | 3 | 480 | 504 | 2.5 | 4.4 | 81.9 | yes | 35 | X |
| Comparative Example | 4 | 488 | 506 | 2.1 | 2.4 | 80.4 | yes | 30 | X |
| Comparative Example | 5 | 481 | 486 | 2.2 | 4.1 | 80.4 | yes | 45 | X |

As shown in Tables 2-1 and 2-2, in the Examples, by performing a predetermined step of final cold rolling, the tensile strength and the breaking elongation were improved while maintaining the preferable 0.2% yield strength and conductivity.

In Comparative Example 1, since the Sn concentration was insufficient, the tensile strength and the 0.2% yield strength in the direction parallel to the rolling direction and the direction orthogonal to the rolling direction at before and after the heat treatment were not sufficient.

In Comparative Example 2, since the Sn concentration was excessive, the breaking elongation in the direction orthogonal to the rolling direction before the heat treatment and after the heat treatment was insufficient.

In Comparative Example 3, since the total working ratio of the final cold rolling is not sufficient, the tensile strength in the direction orthogonal to the rolling direction before the heat treatment and after the heat treatment and the 0.2% yield strength in the direction orthogonal to the rolling direction after the heat treatment were not sufficient.

In Comparative Example 4, since the product of the diameter of the work roll and the workability q exceeds 250, shear band was generated in the material and the tensile strength and breaking elongation in the direction orthogonal to the rolling direction before and after the heat treatment, and 0.2% yield strength in the direction orthogonal to the rolling direction after heat treatment were insufficient.

In Comparative Example 5, the strain rate was slow since the minimum working ratio of each pass was insufficient and the tensile strength in the direction orthogonal to the rolling direction before and after the heat treatment and 0.2% yield strength in the direction orthogonal to the rolling direction after the heat treatment were insufficient.

The invention claimed is:

1. A rolled copper foil for a secondary battery negative electrode current collector, comprising 0.05 to 0.20 mass % of Sn and the rest being copper and inevitable impurities,
    wherein a tensile strength in a direction parallel to the rolling direction is 600 MPa or more, and a breaking elongation in the direction parallel to the rolling direction is 2.0% or more; and
    wherein a tensile strength in a direction orthogonal to the rolling direction is 640 MPa or more, and a breaking elongation in the direction orthogonal to the rolling direction is 3.5% or more.

2. The rolled copper foil for a secondary battery negative electrode current collector according to claim 1, wherein after a heat treatment at 200° C. for 60 minutes, the tensile strength in the direction parallel to the rolling direction is 600 MPa or more, the breaking elongation in the direction parallel to the rolling direction is 2.0% or more, the tensile strength in the direction orthogonal to the rolling direction is 640 MPa or more, and the breaking elongation in the direction orthogonal to the rolling direction is 3.5% or more.

3. The rolled copper foil for a secondary battery negative electrode current collector according to claim 1, wherein a 0.2% yield strength in the direction parallel to the rolling direction is 480 MPa or more, and a 0.2% yield strength in the direction orthogonal to the rolling direction is 510 MPa or more.

4. The rolled copper foil for a secondary battery negative electrode current collector according to claim 1, wherein after a heat treatment at 200° C. for 60 minutes, the 0.2% yield strength in the direction parallel to the rolling direction is 480 MPa or more, and the 0.2% yield strength in the direction orthogonal to the rolling direction is 510 MPa or more.

5. The rolled copper foil for a secondary battery negative electrode current collector according to claim 1, comprising 0.05 to 0.20 mass % of Sn.

6. The rolled copper foil for a secondary battery negative electrode current collector according to claim 1, further comprising 0.01 to 0.10 mass % of Ag.

7. A secondary battery negative electrode current collector, comprising the rolled copper foil for a secondary battery negative electrode current collector according to claim 1.

8. A secondary battery negative electrode, comprising the rolled copper foil for a secondary battery negative electrode current collector according to claim 1.

9. A secondary battery, comprising the rolled copper foil for a secondary battery negative electrode current collector according to claim 1.

10. A method for manufacturing the rolled copper foil for a secondary battery negative electrode current collector according to claim 1, the method comprising a step of hot rolling an ingot, and a step of final cold rolling in which the ingot is rolled to a predetermined thickness,
    wherein in the step of final cold rolling, a working degree q at the end of each pass and a diameter r (mm) of the work roll used in the pass satisfy the relationship $\eta \times r \leq 250$;
    wherein in the step of final cold rolling, a working ratio of each pass is 24% or more; and a total working ratio is more than 99.9%,
    (the working degree $\eta$ is calculated by the following equation:

$$\eta = \ln(T_0/T_n) \qquad \text{Equation 1}$$

wherein $T_0$ is the thickness of the ingot before the step of final cold rolling, and $T_n$ is the thickness of the ingot at the end of n-th pass.)

11. The method for manufacturing a rolled copper foil for a secondary battery negative electrode current collector according to claim 10, further comprising a step of cold rolling and a step of annealing treatment, wherein the step of cold rolling and the step of annealing treatment are performed on the ingot after the hot rolling, and before the step of final cold rolling.

* * * * *